United States Patent [19]

Baum

[11] 4,230,909
[45] Oct. 28, 1980

[54] TELEPHONE ANSWERING MACHINE

[75] Inventor: Elliot I. Baum, Dix Hills, N.Y.

[73] Assignee: Quasar Microsystems, Inc., Brentwood, N.Y.

[21] Appl. No.: 957,463

[22] Filed: Nov. 3, 1978

[51] Int. Cl.³ .................. G11B 15/02; G11B 15/18; G11B 23/32; G11B 23/34
[52] U.S. Cl. .................. 179/6 R; 179/6 TA; 360/72.2; 360/74.4; 360/74.5; 360/12
[58] Field of Search .................. 179/6 R, 6 TA; 360/74.6, 74.7, 69, 12, 72.2, 74.1, 74.4

[56] References Cited
U.S. PATENT DOCUMENTS

| 3,334,194 | 8/1967 | Chang | 360/69 |
| 3,405,238 | 10/1968 | Hurvitz | 360/69 |
| 3,539,728 | 11/1970 | Rubenstein | 179/6 R |
| 3,804,993 | 4/1974 | Honnold et al. | 360/72.2 |
| 3,940,672 | 2/1976 | Vogel | 360/74.4 |
| 3,947,642 | 3/1976 | Meyerle | 179/6 R |
| 4,032,712 | 6/1977 | Catto et al. | 360/74.4 |
| 4,079,200 | 3/1978 | Meri | 179/6 R |

Primary Examiner—Alfred H. Eddleman
Attorney, Agent, or Firm—Arthur L. Lessler

[57] ABSTRACT

A telephone answering machine utilizing either a single magnetic tape containing alternating announcement and message sections, or separate announcement and message tapes. The tape or tapes have permanently affixed magnetic foil sections which are set to provide control signals for the various timing functions performed within the machine. The foil sections on the tape(s) switch the machine between record and playback functions, control the tape transport(s), and control the commencement and duration of the "beep" tone which follows the outgoing announcement.

17 Claims, 8 Drawing Figures

SHEET 1

SHEET 2

SHEET 1

SHEET 2

TELEPHONE ANSWERING MACHINE

This invention relates to telephone answering machines, and more particularly to machines which utilize magnetic tape as the medium for storing outgoing announcements and incoming messages.

Telephone answering machines utilizing magnetic tape, in reels or cassettes, are presently widely available. Such machines, however, contain relatively complex timing and control circuitry, and require separate tapes (or a complex multi-track tape arrangement) for the outgoing announcement and the incoming message to be recorded.

Accordingly, an object of the present invention is to provide a telephone answering machine containing relatively simple timing and control circuitry as compared with prior art telephone answering machines.

Another object of the invention is to provide a telephone answering machine capable of operation with a single cassette having only one record/playback track.

As herein described, according to one aspect of the invention there is provided a telephone answering machine utilizing magnetic tape means having announcement information and message information sections delimited by indicia thereon, said machine comprising: tape transport means for receiving said magnetic tape means; sensing means adjacent said tape transport means for detecting said indicia; means operatively associated with said transport means for recording audio signals on said tape means, said recording means including a microphone selectively operable in an announcement record mode of said machine; means operatively associated with said transport means for reproducing audio signals from said tape means; a telephone ring detector; means for coupling said ring detector to a telephone line; means responsive to the indicia detected by said sensing means for generating sets of start, tone and stop signals; means coupled to said ring detector for enabling said transport means when a telephone ring is detected; means coupled to said signal generating means and operative in an answer mode of said machine, for (i) enabling said reproducing means to reproduce signals from an announcement information section of said tape means in response to said start signal, (ii) disabling said reproducing means and enabling said recording means to record signals on one of said message information sections of said tape means in response to said tone signal, and (iii) disabling said recording means in response to said stop signal; means operative only in said answer mode for coupling audio signals generated by said reproducing means to said telephone line; means for coupling audio signals on said telephone line to said recording means, to record said telephone line audio signals on a message information section of said tape means; means coupled to said counting means and operative in said announcement record mode of said machinde for (i) enabling said recording means to record signals from said microphone on an announcement information section of said tape means in response to said start signal, and (ii) disabling said recording means in response to said tone signal; and manually operable means including said reproducing means for audible playback of the audio signals from said telephone line recorded on a message information section of said tape means.

Also as herein described, according to another aspect of the invention there is provided a telephone answering machine utilizing a single magnetic tape having a plurality of sequentially arranged announcement information sections each followed by a message information section, said machine comprising: tape transport means; means for recording a desired announcement on each of said announcement information sections of said tape; announcement control means coupled to said transport means and responsive to a telephone ring signal for reproducing said announcement from one of said announcement information sections as a first audio signal; means for coupling said first audio signal to a telephone line; message recording means coupled to said transport means and responsive to a second audio signal on said telephone line for recording a corresponding message on the particular message information section of said tape adjacent and following said one announcement information section; timing means for disabling said announcement control means and enabling said message recording means a first predetermined time after occurrence of said ring signal, and for disabling said message recording means a second predetermined time thereafter; and playback means coupled to said transport means for reproducing from said particular message information section of said tape an audible signal corresponding to said second audio signal.

IN THE DRAWING

Figure 1:
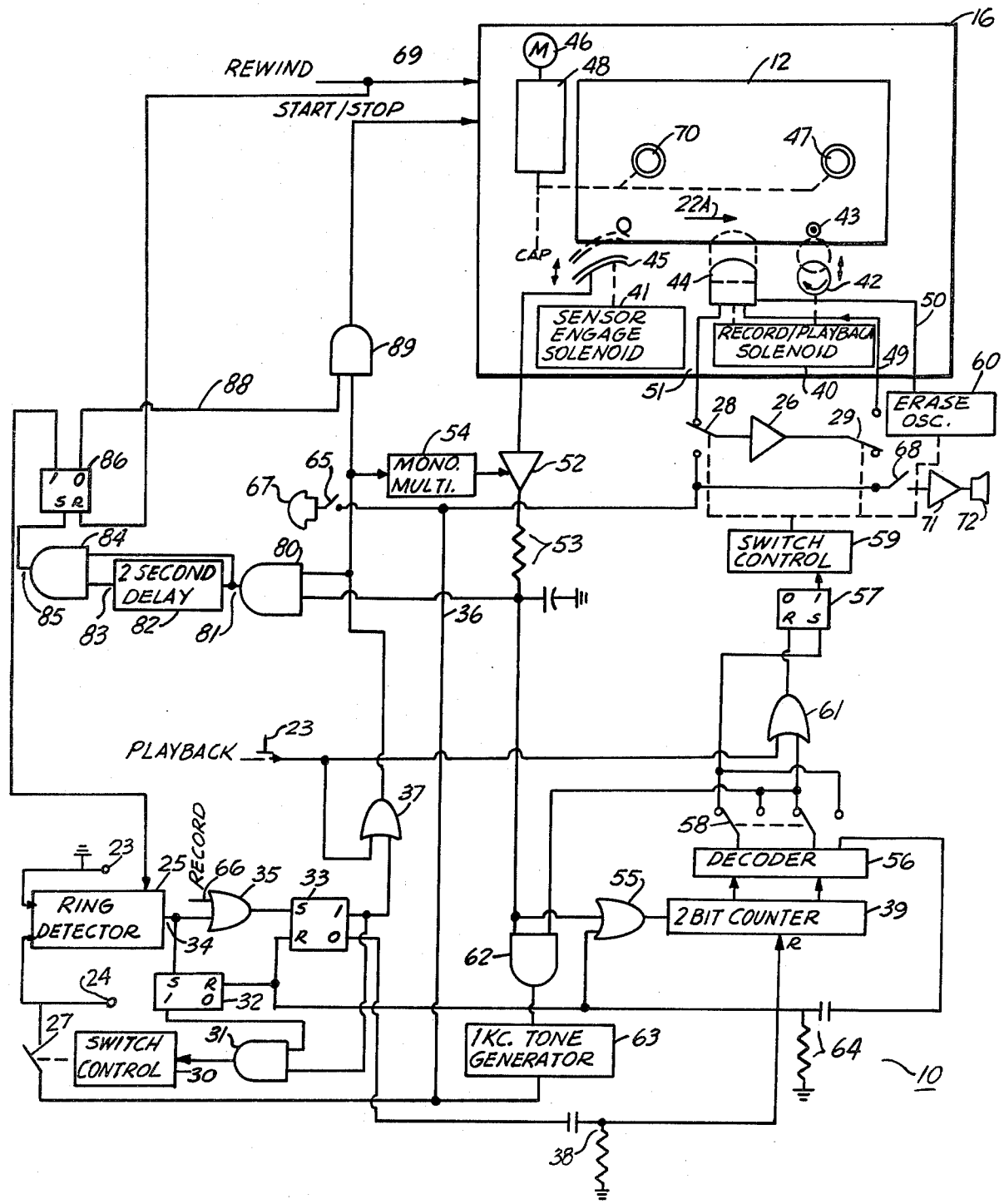
FIG. 1 is a functional block diagram of a telephone answering machine according to a preferred embodiment of the invention, utilizing a single magnetic tape cassette having one record/playback track.
Figure 3:
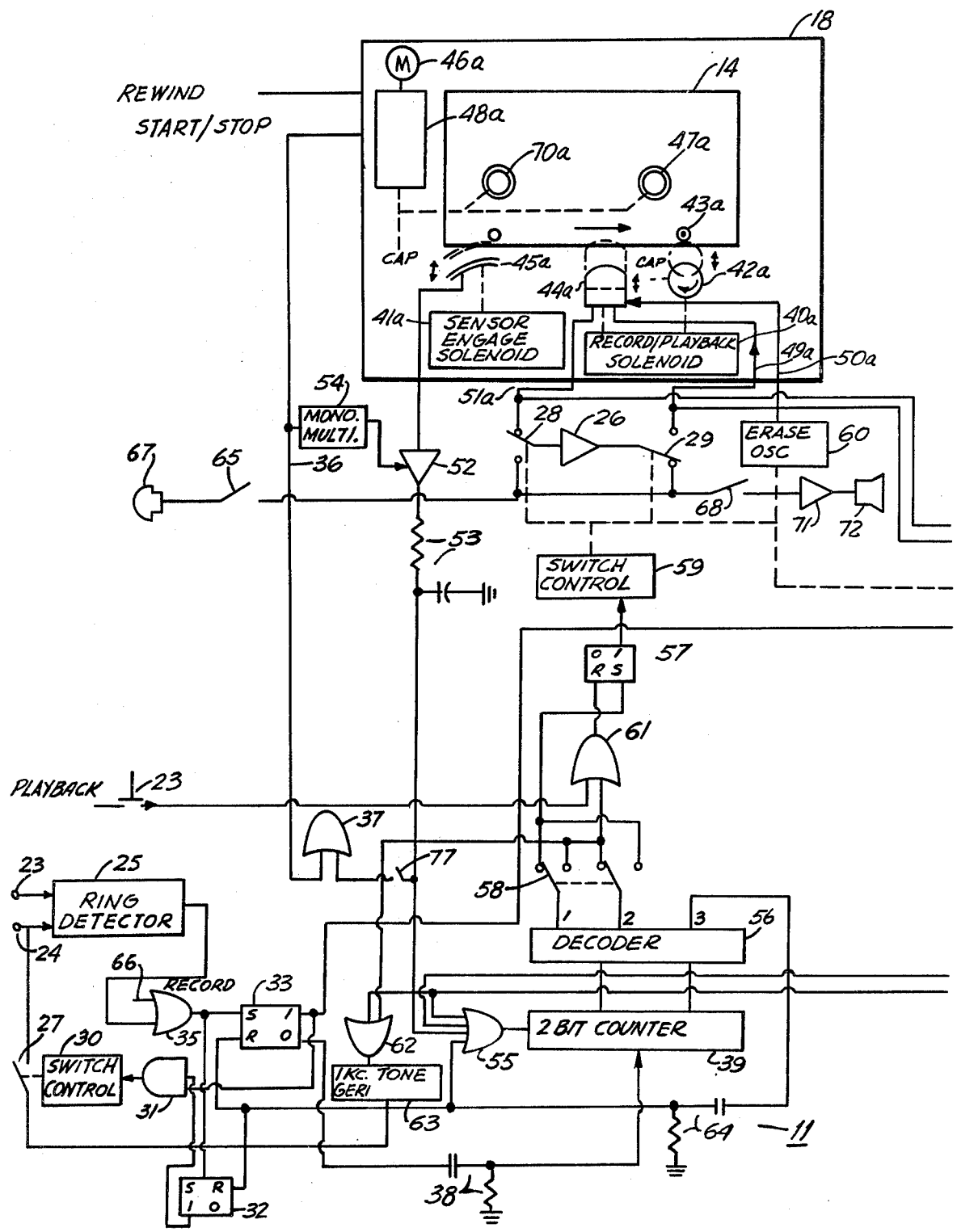
FIG. 3 shows an alternate embodiment of a telephone answering machine according to the invention, utilizing separate announcement and message tapes.
Figure 3:
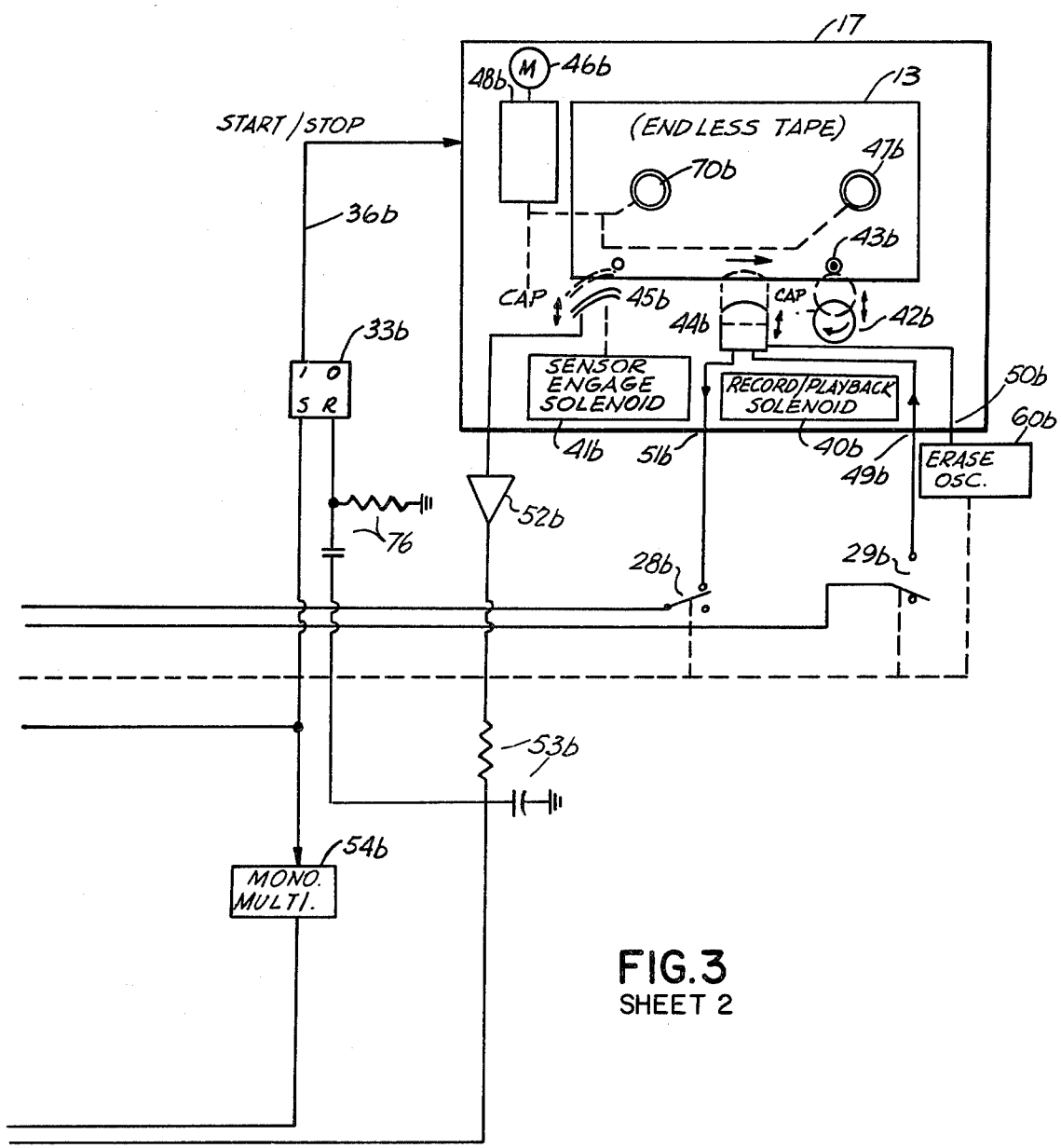

The answering machines 10 and 11 shown in FIGS. 1 and 3 respectively each have the following three operating modes:

(i) an answer mode initiated by detection of a telephone ring, in which a pre-recorded announcement is transmitted to the telephone line and the caller's message is thereafter recorded;

(ii) an announcement record mode in which a microphone is used to record a desired announcement; and (iii) a playback mode in which recorded messages from telephone callers are reproduced through a speaker.

In the machine of FIG. 1 a single tape cassette 12 is utilized, with the outgoing announcement being repetitively pre-recorded on spaced announcement sections of the tape. During the answer mode the tape moves in one direction, with each announcement section transmitting its message to the telephone line, and a message section following the corresponding announcement section serving for recording of the corresponding caller's message. Thus a length of tape contains alternating announcement and message sections, with the transitions between said sections being delimited by indicia on the tape in the form of conductive strips, optically distinctive portions, or magnetic tones or codes. Preferably, conductive strips which can be sensed utilizing spaced electrodes or which are highly reflective are employed for this purpose.

Thus, in order to utilize the machine shown in FIG. 1, a tape cassette 12 must be prepared with the required indicia thereon, and with a plurality of pre-recorded announcement sections containing the desired announcement with which incoming telephone calls are to be answered. The number of pre-recorded announcements must be at least equal to the number of anticipated incoming calls per use. For example, if 20 incoming calls are to be accommodated, there must be at least 20 announcement sections of the tape, each containing the desired pre-recorded announcement.

The telephone answering machine 11 shown in FIG. 3 provides greater flexibility of use (at additional cost) by accommodating separate announcement and message magnetic tape cassettes 13 and 14 respectively. The announcement cassette 13 contains an endless tape having a single announcement thereon, and a single indicia of the type previously described, for timing and control purposes. The message cassette 14 has a tape thereon with a plurality of message sections delimited by similar indicia.

Since the endless tape of the cassette 13 makes one complete revolution for reproducing (or recording) an outgoing announcement, the announcement need be recorded only once. In the answer mode, a telephone ring corresponding to an incoming call initiates transmission of the announcement from the cassette 13, which is rendered inoperative after the announcement is transmitted. As soon as transmission of the outgoing announcement is completed, the cassette 14 is caused to record the incoming message.

Figure 2:
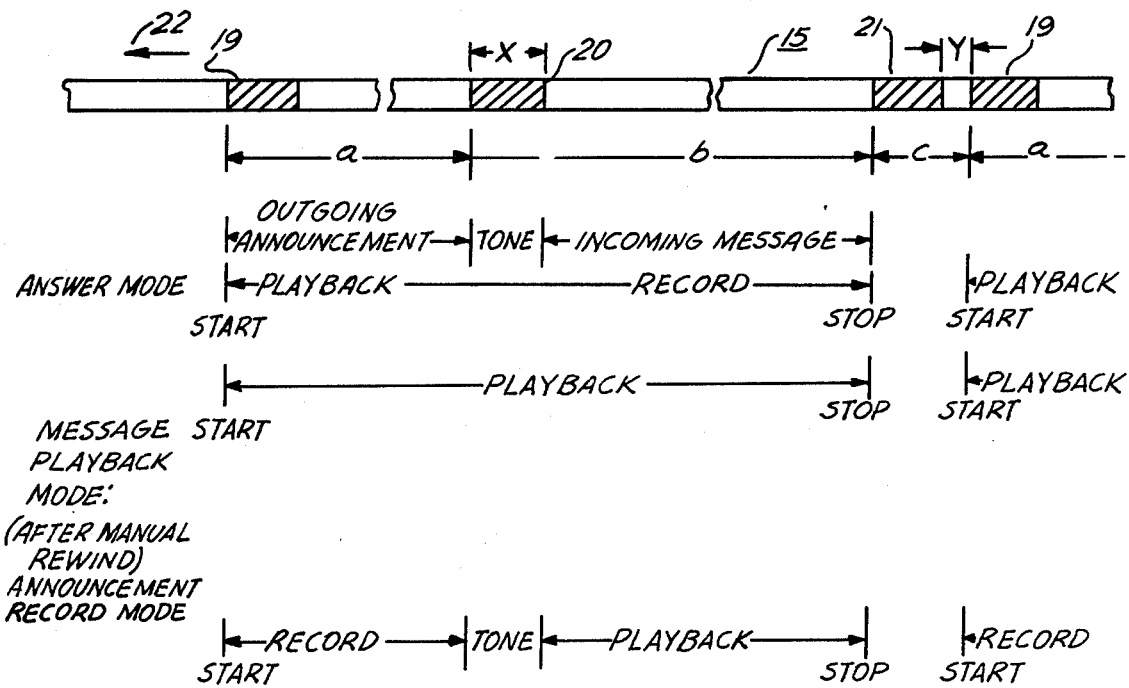
FIG. 2 shows a section of magnetic tape utilized in the machine of FIG. 1.

The overall operation of the answering machine 10 in its various modes will be more clearly understood by reference to FIG. 2, which shows a section of the tape 15 within the cassette 12. In both of the machines 10 and 11, the tape transports 16, 17 and 18 for the cassettes 12, 13 and 14 respectively, move the tapes at a speed of $1\frac{7}{8}$ inches per second.

As seen in FIG. 2, the tape 15 comprises repetitive sets of announcement sections "a" followed by message sections "b" and stop sections "c". The beginning of each announcement section is delimited by the leading edge of a conductive and/or reflective foil strip 19; the beginning of each message section comprises a tone section delimited by a conductive and/or reflective foil strip 20 of length x; and the stop section is delimited by the leading edge of a conductive and/or reflective foil strip 21, with a space y between the trailing edge of the stop strip 21 and the leading edge of the announcement delimiting or start strip 19.

The length of the message section delimiting, or tone strip 20, determines the length of the "beep" tone which signals the calling party that the machine is ready to record an incoming message in its answer mode. Preferably the strip 20 should be approximately 1 inch in length, giving a "beep" tone duration of slightly more than 0.5 seconds. While the lengths of the strips 19 and 21 are not critical, strip lengths on the order of 1 inch are also preferred for these indicia. The distance y between the adjacent stop and start strips 21 and 19 is preferably in the range of 0.5 to 2 inches.

The lengths of the announcement and message sections a and b of the tape 15 are selected to provide corresponding announcement and message time intervals meeting the user's requirements. Typically, the announcement section a may be 38 inches long, providing an announcement time interval of approximately 20 seconds. For a 45 second incoming message recording time, the message section b may be approximately 85 inches long. Obviously these lengths may be altered as desired to provide announcement and message time intervals of any desired duration.

As shown in FIG. 2, in the answer mode the leading edge of the strip 19 initiates transmission of the outgoing message to the telephone line; the leading edge of the strip 20 initiates recording of the incoming message, with the first 0.5 second being dedicated to recording the "beep" tone, the commencement and termination of said tone being defined by the leading and trailing edges of the strip 20 respectively. The movement of the tape is stopped by the leading edge of the stop strip 21; and commencement of the next outgoing announcement transmission is determined by the leading edge of the start strip 19.

The direction of movement is indicated by the arrow 22.

In the announcement record mode the operation of the machine vis-a-vis the announcement and message sections a and b, is reversed. That is, the machine records information (from a microphone) on the announcement section a, and thereafter switches to a playback mode during the message section b, with the tape being brought to a stop at the leading edge of the stop strip 21 corresponding to the beginning of the stop section c.

In the message playback mode, the tone strip 20 is not utilized, and the machine audibly reproduces all information recorded on the tape between the leading edges of the start strip 19 and stop strip 21. Thus, in normal message playback operation the user of the machine will first hear the outgoing announcement audibly reproduced, and immediately thereafter will hear the corresponding incoming message. The machine will then stop, and the user can play back the next recorded message simply by again pressing the playback button 23 (see FIG. 1). Alternatively, the machine may be wired so that the tape 15 moves continuously in the playback mode, and all indicia thereon are ignored.

The manner in which the machine 10 performs the foregoing functions will be more clearly understood by reference to FIG. 1, which shows the mechanical and logic control circuitry for performing the various timing and control functions required.

The various switches in FIG. 1 are shown in their respective positions at commencement of the answer mode.

The machine 10 is connected to a telephone line by means of "tip" and "ring" terminals 23 and 24, which are coupled to a ring detector 25, with terminal 23 being common and terminal 4 coupled to an audio amplifier 26 via decoupling switch 27, amplifier input selector switch 28, and amplifier output switch 29.

A switch control 30, which may comprise a transistor switch control circuit, relay or similar control mechanism, serves to isolate the answering machine circuitry (except the ring detector 25) from the telephone line except when the machine is in its answer mode, i.e. a telephone ring has been detected by the detector 25, and the resulting answer mode cycle is in progress. This isolation is provided by the AND gate 31, which receives inputs from each of the set-reset flip-flops 32 and 33.

That is, when a telephone ring is detected by the detector 25, a corresponding signal on output line 34 thereof goes high, setting the flip-flop 32, and also setting the flip-flop 33 through OR gate 35. Thus both the flip-flops 32 and 33 provide high outputs to the AND gate 31, energizing the switch control 30 and closing the switch contact 27 thereof.

When the output of the flip-flop 33 goes high in response to the detection of a telephone ring by the detector 25, it also provides a start signal to the transport 16 on line 36, via OR gate 37. At this time the "0" output of the flip-flop 33, via a differentiating circuit 38, resets the two bit counter 39 to a "00" count.

When the tape transport 16 is energized, the record/playback solenoid 40 and the sensor engage solenoid 41 are also energized, causing the capstan 42 to move into engagement with the idler 43 to drive the tape 15 in the direction indicated by the arrow 22a, corresponding to the direction in FIG. 2 indicated by the arrow 22, to bring the record/playback head 44 into engagement with the magnetic surface of the tape 15; and to also bring the sensor 45, comprising two adjacent vertically aligned electrodes, into contact with the tape 15. Alternatively, the tape head 44 and sensor 45 may be manually engaged in the answer mode with the celinoid 40 operating the capstan 42 only.

At approximately the same time, the signal on line 36 energizes the transport motor 46, which drives the takeup drive pin 47 and the capstan 42 through a transission 48.

If desired, a single solenoid can act both as the sensor engage solenoid 41 and the record/playback solenoid 40, with the sensor electrodes 45, head 44 and capstan 42 mounted on a common slidable plate.

The record/playback head 44 receives record signals on line 49 and erase signals on line 50, and provides low level audio playback signals on line 51. Engagement of the sensor electrodes 45 with conductive strips on the tape 15 of the cassette 12 is detected by a detector/amplifier 52, the output of which goes high when a conductive strip is engaged by the electrodes 45, and goes low when said strip no longer contacts the electrodes 45. The output of the detector/amplifier 52 is filtered by an RC network 53 to eliminate undesirable switching signals due to contact bounce. The time constant of the network 53 may typically be on the order of 0.2 milliseconds.

A monostable multivibrator 54 disables the detector/amplifier 52 until after the trailing edge of the stop strip 21 (FIG. 2) has been traversed, to avoid "confusing" the timing circuitry. With a stop strip width of one inch, a space between the strips 21 and 19 of 0.5 inch, and a tape speed of 1⅞ inches per second, and allowance of 0.5 second for the mechanical delays in the transport 16, the monostable multivibrator 54 should have a pulse or delay width of approximately 0.7 second.

If desired, the space between the strips 19 and 21 may be eliminated, in which case the effect of the trailing edge of the delay pulse generated by the multivibrator 54 will be to "simulate" an equivalent leading edge for the strip 19.

Therefore when the tape transport 16 begins to move the tape 15, and the detector/amplifier 52 is enabled, it senses the leading edge (or "equivalent" leading edge) of the strip 19, and its output goes high, said output being coupled to the input of the counter 39 through an OR gate 55, causing the output of the counter 39 to count up from "00" to "01". The output of the counter 39 is coupled to a decoder 56, causing output line 1 of said decoder to go high.

When the decoder output on line 1 goes high, it is coupled to the set terminal of a set-reset flip-flop 57 via a mode switch 58, causing the switch control 59 (which comprises one or more transistor switching circuits, relays, or similar devices) to disable the erase oscillator 60, place the amplifier input switch 28 in a position to couple the amplifier input to record/playback head line 51, and place the amplifier output switch 29 in a position to couple the amplifier output to the telephone line via isolation switch 27.

Since the tape 15 is now in motion, the signal on line 51 from the record/playback head 44, transduced from the announcement section a of the tape 15, is amplified by the audio amplifier 26 and coupled to the telephone line via switch 27 and terminals 23 and 24, causing the pre-recorded announcement to be coupled to the telephone line so that it is heard by the calling party.

When the tone strip 20 engages the electrodes 45 at the end of the announcement section a of the tape 15, the output of the detector/amplifier 52 again goes high (having gone low at the trailing edge of the start strip 19), and remains high for approximately 0.5 second, corresponding to the width x of the strip 20. At the time the output of detector/amplifier 52 goes high, it is coupled to the counter 39 via OR gate 55, causing the counter to count up to "10" and causing the output of the decoder 56 on line 1 to go low and the output thereof on line 2 to go high.

When the decoder output on line 2 goes high, it is coupled to the reset terminal of flip-flop 57 through an OR gate 61, thus resetting the flip-flop 57 and the switch control 59, to (i) turn on the erase oscillator 60, (ii) operate switch 28 to couple the input terminal of amplifier 26 to the telephone line via isolation switch 27, and (iii) operate output switch 29 to couple the output of audio amplifier 26 to line 49 of record/playback head 44.

The aforementioned operations of the switch control 59 place the machine 10 in a record condition, so that incoming audio signals on the telephone line are coupled to the input terminal of amplifier 26, with the output of said amplifier recording said signals on the message section b of the tape 15. The erase oscillator 60 "cleans" the message section of the tape to remove previously recorded message signals.

At the same time, when line 2 of decoder 56 goes high, AND gate 62 is enabled for approximately 0.5 second, i.e. the time required for the tone strip 20 to traverse the sensing electrodes 45. Thus the output of AND gate 62 goes high for approximately 0.5 second at the commencement of the placing of the machine in a record mode, so that the "beep" 1 kHz. tone generator 63 is turned on for approximately 0.5 second, thus providing a "beep" tone which is (i) coupled to the telephone line via isolation switch 27 and simultaneously (ii) recorded at the beginning of the message section b of the tape 15 via switch 28, audio amplifier 26, switch 29, and record/playback head 44.

It should be noted that when the output of the decoder 56 on line 1 goes low, and the output thereof on line 2 goes high, the movement of the tape 15 is not affected, but the circuitry is switched from a tape reproduction to a tape record condition, and the "beep" tone is generated and simultaneously coupled to the telephone line and recorded.

The tape 15 continues to move and to record the incoming message from the caller, until the leading edge of the stop strip 21 engages the sensor electrodes 45, at which time the output of the detector/amplifier 52 again goes high, said output being coupled to the counter 39 via OR gate 55 to cause the output of the counter to count up to "11", thus causing line 2 of decoder 56 to go low and line 3 thereof to go high.

When line 3 of decoder 56 goes high, a pulse is coupled through differentiating network 64 to (i) the input of counter 39 via OR gate 55 to cause the counter to count back to "00", thus causing the output of decoder 56 on line 3 to go low, so that all three outputs of decoder 56 are low; and (ii) the reset terminals of flip-flops 32 and 33, causing them to reset.

When the flip-flops 32 and 33 are thus reset, the out of AND gate 31 goes low, causing switch control 30 to open isolation switch 27. At the same time, the "one" output of flip-flop 33 goes low, causing the signal on line 36 to also go low and stopping the movement of the tape 15 by the transport 16. When the transport 16 is thus caused to stop moving the tape 15, the motor 46 stops and springs (not shown) associated with the solenoids 40 and 41 move the record/playback head 44, capstan 42 and sensing electrodes 45 away from the cassette 12. This completes the operation of the machine 10 in its answer mode.

Figure 1A:
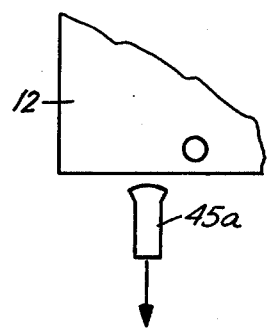
FIG. 1a shows a photoelectric sensing arrangement employed in an alternative embodiment of the machine shown in FIG. 1.

The sending electrodes 45 preferably comprise a pair of adjacent resilient conductive elements, which engage electrically conductive strips 19, 20 and 21 on the tape 15. Alternatively, however, the tape 15 may utilize optically distinctive indicia, and the sensor electrodes 45 may be replaced by a photoelectric detector 45A as shown in FIG. 1a.

The photoelectric detector 45A may comprise a light emitting diode and a phototransistor mounted in a unitary housing, such devices being known in the art and commercially available. The optically distinctive sections of the tape 15 may comprise the conductive strips 19, 20 and 21, provided that said strips are optically distinctive, and preferably reflective. Alternatively, the tape 15 may be provided with elongated holes along its longitudinal axis, with the photosensor 45A detecting the optical distinctiveness of said holes as compared with the tape surface.

If the photodetector 45A is employed (with optically distinctive tape indicia), the sensor engage solenoid 41 may be eliminated, since physical contact between the photosensor 45A and the tape surface is neither necessary nor desirable.

The answering machine 10 is placed in the announcement record mode by moving the double pole-double throw mode switch 58 to the other position thereof, closing the microphone switch 65, and applying a high record signal to OR gate 35 on line 66.

When the signal on line 66 is applied to OR gate 35, flip-flop 33 is set, causing motor 46 of transport 16 to start and engaging the solenoids 40 and 41. However, since the output of flip-flop 32 remains low, the output of AND gate 31 is likewise low and isolation switch 27 remains open.

As tape 15 (see FIG. 2) of cassette 12 begins to move, the leading edge (or "equivalent" leading edge) of start strip 19 is detected by electrodes 45, causing the output of detector/amplifier 52 to go high, so that the output of counter 39 counts to "01," causing line 1 of decoder 56 to go high. Note that counter 39 was initially reset to "00" via differentiating network 38 at the time flip-flop 33 was set.

When line 1 of decoder 56 goes high, it causes flip-flop 57, via OR gate 61, to be reset, so that switch control 59 places the machine in a record mode, by (i) operating switch 28 to couple the input of amplifier 26 to the microphone 67 via switch 65, (ii) operating switch 29 to couple the output of amplifier 26 to the record line 49 of record/playback head 44, and (iii) turning on the erase oscillator 60.

The user of the machine may then record a desired announcement by speaking into the microphone 67, to cause a corresponding audio signal to be recorded on the announcement section a of the tape 15.

The user may continue to dictate his desired announcement via the microphone 67, until the end of the announcement section a of the tape 15. When the tone strip 20 is sensed by electrodes 45 at the end of said announcement section, the output of the detector/amplifier 52 again goes high (having gone low after the trailing edge of the start strip 19 passed the electrodes 45), causing the counter 39 to count to "10," so that line 1 of decoder 56 goes low and line 2 thereof goes high.

When line 2 of decoder 56 goes high, it resets flip-flop 57, causing switch control 59 to operate switches 28 and 29 to place the machine in a playback mode (simultaneously turning off the erase oscillator 60), thus effectively "cutting off" the microphone 67 from the amplifier 26 and terminating the recording of a desired announcement.

The tape 15 continues to move, with a previously existing message being played back (but not heard unless the speaker switch 68 is closed), until the stop strip 21 is detected by the sensor electrodes 45, at which time the output of the counter 39 counts to "11", causing line 2 of decoder 56 to go low and line 3 to go high, thus stopping the machine 10 in the manner previously described for the answer mode of said machine.

The message playback mode is initiated by depressing pushbutton 23 to provide a start signal to transport 16 on line 36 (via OR gate 37) and to reset flip-flop 57 (via OR gate 61) to place the machine in a playback condition as previously described, and by closing speaker switch 68.

In order to play back a previously recorded message, the tape 15 of the cassette 12 must be rewound, by providing a rewind signal to the transport 16 on line 69, to cause the motor 46 to drive the rewind drive wheel 70 via the transport 48.

The mode switch 58 is set in the announcement record position as previously described.

The playback pushbutton 23 is then depressed, either momentarily or continuously, as desired by the user.

When the playback pushbutton 23 is depressed (or a corresponding switch is actuated), the flip-flop 57 is held in its reset state via OR gate 61, so that the machine is maintained in a playback condition as previously described. As long as playback pushbutton (or switch) 23 is engaged, the transport 16 keeps the tape 15 in motion (due to the signal on line 36) so that all audio signals recorded on the tape are played back through the power amplifier 71 and speaker 72.

The dual cassette machine 11 of FIG. 3 operates in a manner generally similar to that of the single cassette machine 10 of FIG. 1 insofar as timing and control functions are concerned, similar functional elements in FIG. 3 having numerals identical to those of corresponding elements in FIG. 1. The tape transport 18 of FIG. 3 operates in a manner generally similar to that of the transport 16 of FIG. 1, with similar components having the same numerals followed by "a". The tape transport 17 also operates in a similar manner to the transport 16, with similar components being identified by the same numerals followed by "b". A "b". is also used to designate similar circuit elements to those in FIG. 1 and in other parts of FIG. 3.

In the arrangement shown in FIG. 3, the transport 17 and cassette 13 are utilized only in the answer and announcement record modes, and the transport 18 and cassette 14 are utilized only in the answer and playback modes.

In addition to the transport 17, the dual cassette machine 11 also contains an auxiliary transport control set-reset flip-flop 33b, a detector/amplifier 52b, monostable multivibrator 54b, erase oscillator 60b, switches 28b and 29b, and filter 53b.

Figure 4:
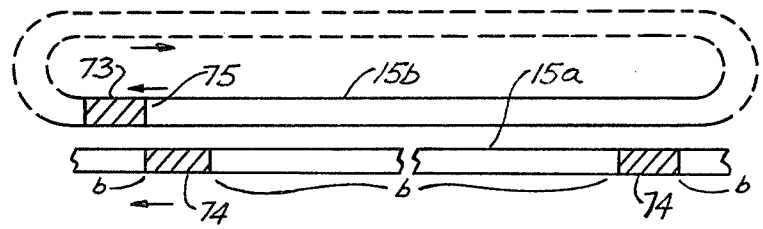
FIG. 4 shows sections of the announcement and message tapes utilized in the machine of FIG. 3.
Figure 5:
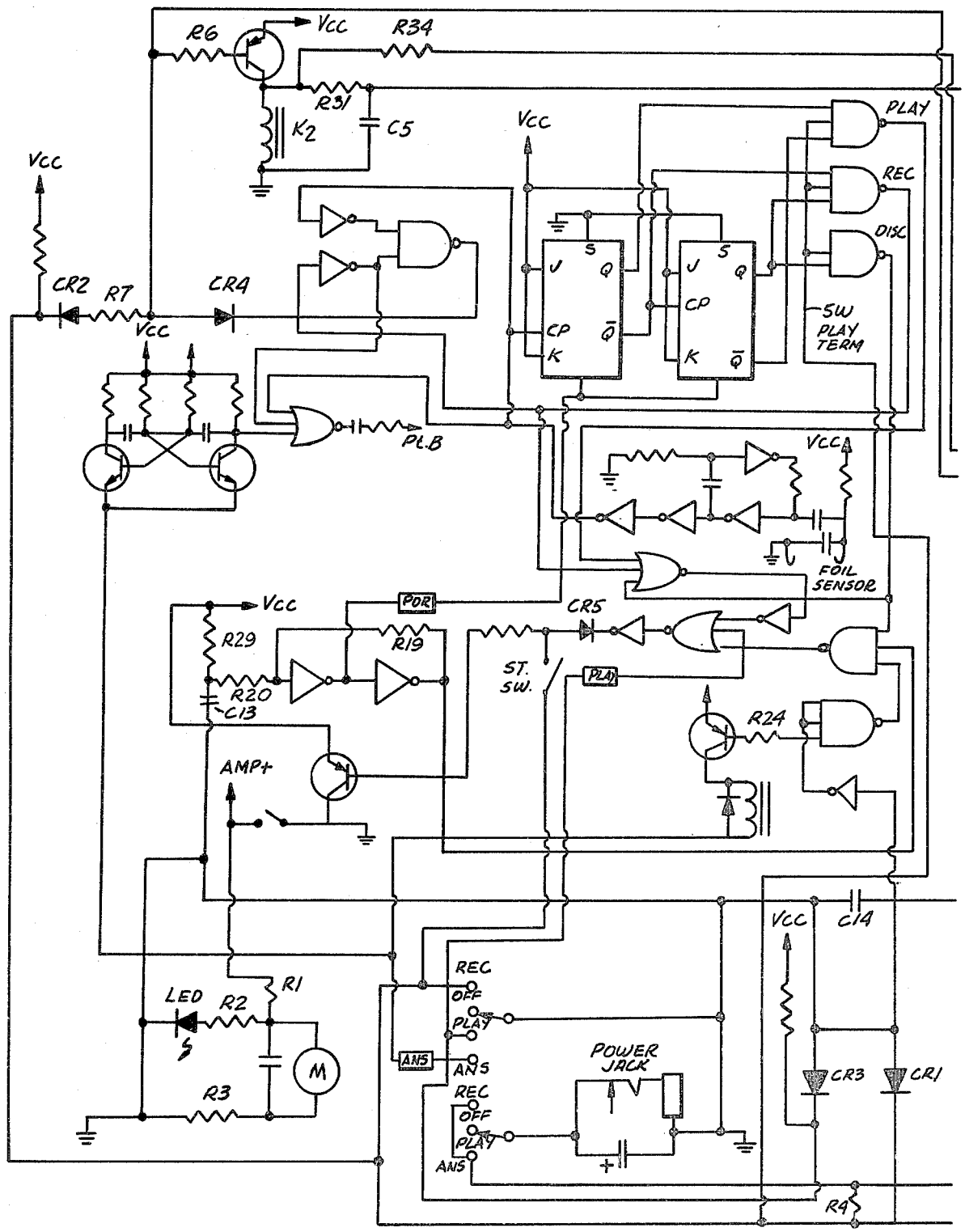
FIG. 5 is a functional schematic diagram of a telephone answering machine of the type illustrated in block diagram form in FIG. 1.
Figure 5:
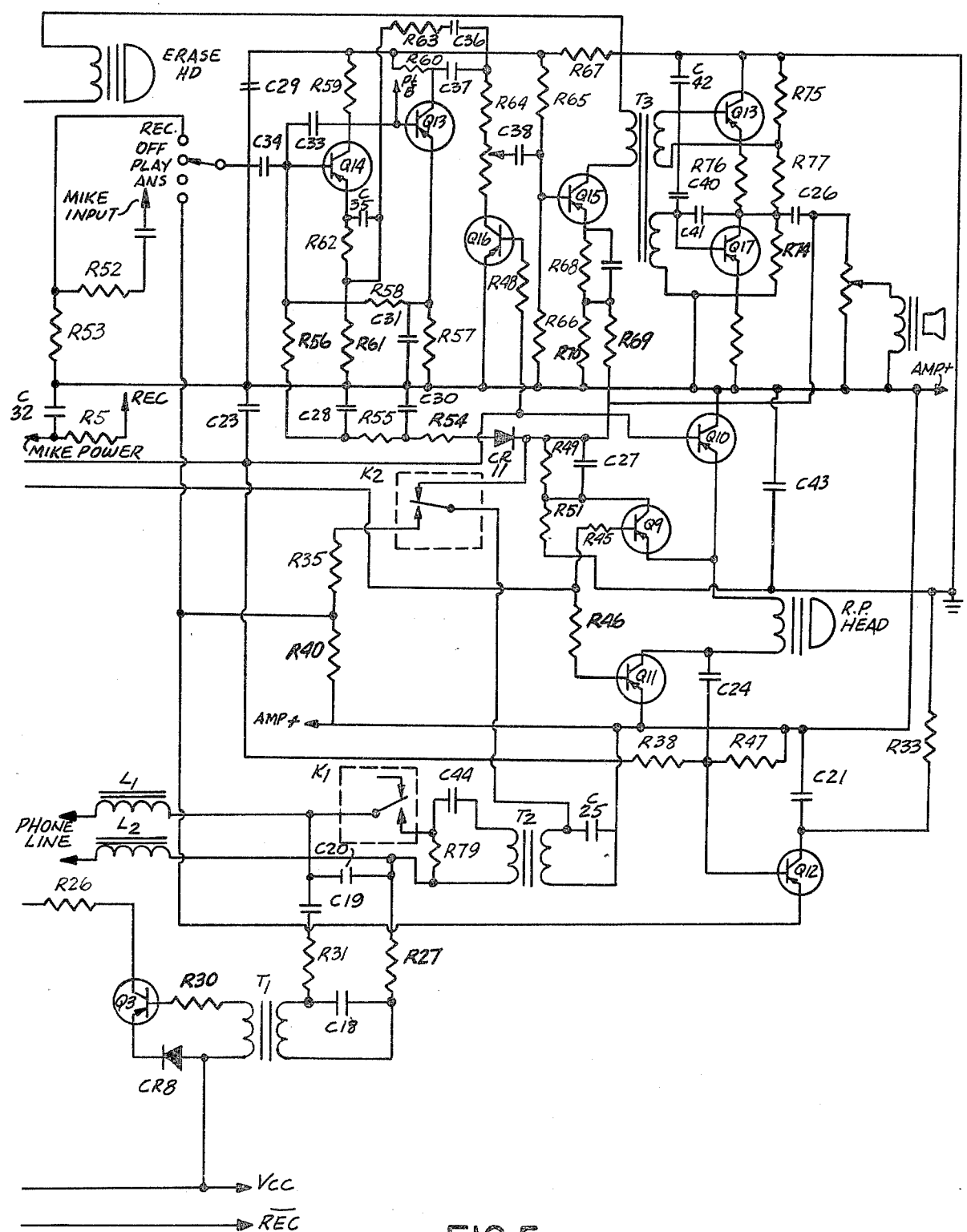

The announcement transport 17 contains an announcement cassette 13 with an endless tape 15b, as shown in FIG. 4. The tape 15b has a single conductive and/or reflective strip 73, having a length selected to define the desired "beep" tone duration, preferably 1 inch.

The message transport 18 has a message cassette 14 with a message tape 15a as also shown in FIG. 4, with a series of message sections b separated by conductive and/or reflective strips 74.

In the answer mode the endless tape 15b makes one complete revolution to transmit the outgoing announcement after a telephone ring has been detected by the ring detector 25. The tape 15b starts and stops with the trailing edge 75 of the strip 73 approximately aligned with the record/playback head 44b. Thus the strip 73 is traversed at the end of each announcement cycle. The pulse signal (approximately 0.5 second in duration) thus generated at the end of each announcement cycle is utilized to generate the "beep" tone via and the AND gate 62 and tone generator 63, in a manner similar to that previously described with reference to the machine 10.

The signal generated at the output of the detector/amplifier 52b corresponding to the trailing edge 75 of the strip 73 serves to initiate movement of the tape 15a of the cassette 14 and the transport 18 in the answer mode.

The switches 28b and 29b are shown in their positions corresponding to the answer mode.

In the answer mode, detection of a ring by the detector 25 results in closing the isolation switch 27 and setting the flip-flops 33 and 33b, while resetting the counter 39 to "00" count, so that all output lines of the decoder 56 are low. Shortly after the flip-flop 33b is set, the output of the monostable multivibrator 54b is coupled to the input of counter 39 via OR gate 55, causing the counter to count to "01". Alternatively, the multivibrator 54b may be eliminated, and the signal applied to reset terminal R of counter 39 internally applied to the counter so as to "reset ⇌ the counter to a "01" count.

When the flip-flop 33b is set, its output on line 36b causes the takeup drive wheel 47b to move the tape 15b in the cassette 13, and the solenoids 40b and 41b are actuated to cause the record/playback head 44b, capstan 42b and sensor electrodes 45b to engage the tape 15b.

Since the tape 15b previously stopped with the trailing edge 75 of the strip 73 adjacent to the sensor electrodes 45b, no signal is generated at the output of the detector/amplifier 52b until a revolution of the endless tape 15b is nearly completed. When the leading edge of the strip 73 is detected by the electrodes 45b at the end of the revolution tape 15b, the output of detector/amplifier 52b goes high, said output being filtered by RC network 53b to eliminate contact bounce.

Thus when a ring is detected the counter is first reset and shortly thereafter (typically 0.1 millisecond later) set to a "01" count, causing the output of the decoder 56 on line 1 to go high and setting the flip-flop 57. When the flip-flop 57 is set the switch control 59 operates switches 28, 29, 28b, 29b and erase oscillators 60 and 60b to connect the input of amplifier 26 to the output of record/playback head 44b, and to turn off the erase oscillator 60b.

Since the flip-flop 33b has been set and caused the tape transport 17 to commence operation, the announcement previously recorded on the endless tape 15b is amplified by the audio amplifier 26 and coupled to the telephone line through isolation switch 27, which has been closed in the manner previously described with reference to the machine 10. Thus the previously recorded announcement is transmitted to the calling party via the telephone line.

At the end of the transmission of the announcement, the leading edge of the strip 73 is detected by the electrodes 45b, causing the output of detector/amplifier 52b to go high and to remain high for a time corresponding to the strip width, typically 0.5 second.

When the output of detector/amplifier 52b goes high, counter 39 counts to "10" in response thereto, but flip-flop 33b, the reset terminal of which responds only to negative going signals, is unaffected, since a positive going signal is coupled thereto through the differentiating network 76.

When counter 39 thus counts to "10", the output of decoder 56 on line 1 goes low and the output thereof on line 2 goes high, thus resetting flip-flop 57 and causing switch control 59 to operate switches 28, 29 and 28b to disengage the record/playback head 44b of the transport 17 from its associated circuitry, and connecting the input of amplifier 26 to the telephone line and the output thereof to line 49a of record/playback head 44a.

The high signal on line 2 of decoder 56 is also coupled to line 36 via OR gate 37 to start the tape transport 18, so that audio signals from the telephone line are coupled through switch 27 to the input of amplifier 26, and the corresponding amplified output signals are recorded on a message portion b of the tape 15a within the cassette 14.

The signal on line 2 of decoder 56 is also coupled as an input to the AND gate 62, so that said AND gate provides an output pulse commencing at the end of the announcement on the tape 15b (i.e. the leading edge of the strip 73) and having approximately a 0.5 second duration corresponding to the length of the strip 73 on the endless tape 15b. This output pulse from the AND gate 62 causes the 1 kilohertz tone generator 63 to provide a 0.5 second "beep" tone which is transmitted to the calling party via the telephone line and simultaneously recorded on the initial portion of the message section of the tape 15a within the cassette 14 of the transport 18.

The tape 15a within the cassette 14 then commences to record the incoming message from the calling party, and continues to record said message until the leading edge of the next one of the strips 74 (see FIG. 4) is detected by the electrodes 45a, causing the output of detector/amplifier 52 to again go high, and increasing the count of the counter 39 to "11". This increase in the count of counter 39 causes line 2 of decoder 56 to go low and line 3 thereof to go high, advancing the counter 39 to "00" and, due to the absence of a high signal on line 2 of decoder 56, making the signal on line 36 low and stopping the movement of the tape 15a of the cassette 14 in the transport 18.

Thus the tape 15a stops at a position with the leading edge of a strip 74 adjacent the sensing electrodes 45a.

When the transport 18 is energized during the next cycle of machine operation, by a high signal on line 36, the monostable multivibrator 54 inhibits the detector-/amplifier 52 for a time corresponding to at least the length of the corresponding strip 74, i.e. at least to 0.6 seconds for a one inch strip length, so as to permit the trailing edge of said strip to pass the sensor electrodes 45a before the detector/amplifier 52 is rendered operative, thus avoiding any possibility of "confusing" the logic circuitry of the machine 11.

In the announcement record mode of the machine 11, the microphone 67 is utilized to record a desired announcement on the tape 15a, in a manner similar to that described in connection with the machine 10.

In the announcement record mode, the microphone switch 65 is closed, the mode switch 58 is moved to the other position than that shown in FIG. 3, the switches 28 and 29 are in their positions other than those shown in FIG. 3, and the switches 28b and 29b are also in their positions other than those shown in FIG. 3.

A record signal provided on line 66 to the OR gate 35 sets the flip-flop 33, which resets the counter 39 and sets the flip-flop 33b to initiate operation of the transport 17, while triggering the monostable multivibrator 54b to advance the count of the counter 39 to "01".

The resulting high signal on line 1 of decoder 56 resets the flip-flop 57 to place the switches 28, 29, 28b and 29b in positions for recording signals from the microphone 67 on the announcement tape 15b, as previously described. This announcement record cycle is terminated when the leading edge of the strip 73 causes the count of the counter 39 to advance to "10", bringing line 1 of decoder 56 low and line 2 thereof high. Approximately 0.5 second later the output of detector/amplifier 52b goes low, resetting flip-flop 33b and halting the movement of the tape 15b of the cassette 13 in the transport 17.

To prevent undesired operation of the transport 18 in the announcement record mode, the switch 77 is open in this mode, said switch being closed in the answer and playback modes.

In the playback mode the flip-flop 33 remains in its reset state, so that no signal is applied to the flip-flop 33b to energize the announcement tape transport 17. Thus only the transport 18 operates in the playback mode, and its operation is substantially the same as that of the transport 16 of the machine 10 in said mode.

While particular embodiments of the invention have been disclosed, it is evident that the particular mechanical and electrical elements used may be varied by those skilled in the art to provide elements which perform equivalent functions. For example, the counter 39 and decoder 56 could be replaced with a three stage shift register containing a single "one" which is successive moved between the three stages.

Rather than hard wired logic, a suitably programmed microprocesser could be employed to perform the various logical and switching functions required.

The endless cassette tape 13 could be replaced by a single spool endless tape, and a reel to reel tape could be substituted for the cassette 14.

Other indicia on the tape than conductive or reflective strips or holes, could be employed. Such indicia might comprise, for example, sections of tape containing prerecorded analog or digital code signals, or transparent tape sections.

At the end of the magnetic tape 15 a relatively long conductive foil strip is provided, to enable protection of the end of the tape. This end-of-tape foil strip may preferably be approximately four inches long, to provide a signal pulse at the output of the amplifier 52 which is at least two seconds in duration (at the tape speed of 1 and ⅞ inches per second). The start/stop signal on line 36 as well as the output signal from the amplifier 52, is coupled to an AND gate 80, so that the output of the AND gate 80 on line 81 is present only when the transport 16 is activated, and has a pulse duration slightly greater than two seconds.

The leading edge of the signal on line 81 actuates a two second delay circuit 82, which generates an output pulse two seconds after the leading edge of the signal on line 81. This output pulse on line 83 and the signal on line 81 are coupled to another AND gate 84, which provides an output signal on line 85 when the pulse on line 81 has a duration greater than two seconds.

The end-of-tape signal on line 85 sets a flip-flop 86, so that the "one" output thereof on line 87 disables the ring detector 85, while the "zero" output thereof on line 88 operates, via the AND gate 89, to stop the movement of the transport 16 by decoupling the start signal on line 36 from the corresponding transport input terminal.

When a rewind signal on line 69 is coupled to the transport 16, the transport is caused to rewind, and the flip-flop 86 is reset, thus enabling the ring detector 25, as well as any signal present on line 36, and returning the answering machine to normal operation.

I claim:

1. A telephone answering machine utilizing a single magnetic tape having a plurality of sequentially arranged announcement information sections each followed by a message information section, said sections being delimited by indicia on said tape, said machine comprising:

tape transport means for receiving said tape;
sensing means coupled to said tape;
transport means for detecting said indicia;
means for recording a desired announcement on each of said announcement information sections of said tape;
announcement control means coupled to said transport means and said sensing means, and responsive to selected ones of said indicia and to a telephone ring signal for reproducing said announcement from one of said announcement information sections as a first audio signal;
means for coupling said first audio signal to a telephone line;
message recording means coupled to said transport means and said sensing means, and responsive to a second audio signal on said telephone line for recording a corresponding message on the particular message information section of said tape adjacent and following said one announcement information section;

timing means coupled to said sensing means and responsive to selected ones of said indicia for disabling said announcement control means and enabling said message recording means a first predetermined time after occurrence of said ring signal, and for disabling said message recording means a second predetermined time thereafter; and playback means coupled to said transport means and said sensing means, and responsive to selected ones of said indicia for reproducing from said particular message information section of said tape an audible signal corresponding to said second audio signal.

2. A telephone answering machine according to claim 1, wherein said announcement information sections and message information sections of said tape have first and second fixed lengths respectively.

3. A telephone answering machine according to claim 2, wherein said announcement control means and said timing means include means for sensing timing indicia on said tape, said indicia defining said first and second fixed lengths.

4. A telephone answering machine according to claim 3, wherein said sensing means comprises a pair of electrodes for detecting the presence of conductive strips on said tape.

5. A telephone answering machine according to claim 3, wherein said sensing means comprises a photoelectric circuit for sensing optically distinctive portions of said tape.

6. A telephone answering machine utilizing a single magnetic tape having a plurality of sequentially arranged sets of fixed length announcement and message information sections, each announcement information section being followed by a message information section, each set having a start signal indicia at the commencement of said announcement information section, a tone signal indicia at the termination of said announcement information section, and a stop signal indicia at the termination of said message information section, all of said indicia being permanently disposed on said tape, said machine comprising:

tape transport means for receiving said tape;

sensing means adjacent said transport means for detecting said indicia;

means operatively associated with said transport means for recording audio signals on said tape, said recording means including a microphone selectively operable in an announcement record mode of said machine;

means operatively associated with said transport means for reproducing audio signals from said tape;

a telephone ring detector;

means for coupling said ring detector to a telephone line;

means for counting the number of said indicia detected by said sensing means and generating sets of start, tone and stop signals;

means coupled to said ring detector for resetting said counting means and enabling said transport means when a telephone ring is detected;

means coupled to said counting means and operative in an answer mode of said machine, for (i) enabling said reproducing means in response to said start signal, (ii) disabling said reproducing means and enabling said recording means in response to said tone signal, and (iii) disabling said recording means in response to said stop signal;

means operative only in said answer mode for coupling audio signals generated by said reproducing means to said telephone line;

means for coupling audio signals on said telephone line to said recording means, to record said telephone line audio signals on the message information section of said tape;

means coupled to said counting means and operative in said announcement record mode of said machine for (i) enabling said recording means in response to said start signal, and (ii) disabling said recording means in response to said tone signal; and manually operable means including said reproducing means for audible playback of the audio signals from said telephone line recorded on the message information section of said tape.

7. A telephone answering machine according to claim 6, wherein said sensing means comprises a pair of electrodes for detecting the presence of conductive strips on said tape.

8. A telephone answering machine according to claim 6, wherein said sensing means comprises a photoelectric circuit for sensing optically distinctive portions of said tape.

9. A telephone answering machine according to claim 6, further comprising means operative in said answer mode for generating an audio tone signal after said audio signals are reproduced, and means coupled to said sensing means for controlling the time of commencement and the duration of said tone signal in response to said tone indicia signal on said tape.

10. A telephone answering machine utilizing a magnetic announcement tape and a separate magnetic message tape, said announcement tape providing repetitive announcement information sections thereof separated by first indicia permanently disposed thereon, said message tape providing a plurality of message information sections thereof separated by second indicia permanently disposed thereon, said machine comprising first and second tape transport means for receiving said announcement and message tapes respectively;

sensing means adjacent each of said transport means for detecting said indicia;

means operatively associated with both of said transport means for selectively recording audio signals on said tapes, said recording means including a microphone coupled to said first transport means and selectively operable in an announcement record mode of said machine;

means operatively associated with both of said transport means for selectively reproducing audio signals from said tapes;

a telephone ring detector;

means for coupling said ring detector to a telephone line;

means for counting the number of said indicia detected by said sensing means and generating sets of start, tone and stop signals;

means coupled to said ring detector for enabling said first transport means when a telephone ring is detected;

means coupled to said counting means and operative in an answer mode of said machine, for (i) enabling said reproducing means and first transport means in response to said start signal, (ii) disabling said reproducing means and first transport means and signal for reproducing said announcement from one of said announcement information sections as a first audio signal;

means for coupling said first audio signal to a telephone line;

message recording means coupled to said transport means and responsive to a second audio signal on said telephone line for recording a corresponding message on the particular message information section of said tape adjacent and following said one announcement information section;

timing means, including means for sensing timing indicia on said tape, for disabling said announcement control means and enabling said message recording means a first predetermined time after occurrence of said ring signal, and for disabling said message recording means a second predetermined time thereafter;

playback means coupled to said transport means for reproducing from said particular message information section of said tape an audible signal corresponding to said second audio signal;

means for generating an audio tone signal after said first audio signal is reproduced; and tone signal control means coupled to said tape transport means for controlling the time of commencement and the duration of said tone signal in response to indicia on said tape.

* * * * *